(12) United States Patent
Watanuki et al.

(10) Patent No.: US 10,317,769 B2
(45) Date of Patent: Jun. 11, 2019

(54) SEMICONDUCTOR DEVICE

(71) Applicant: Renesas Electronics Corporation, Koutou-ku, Tokyo (JP)

(72) Inventors: Shinichi Watanuki, Ibaraki (JP); Yasutaka Nakashiba, Ibaraki (JP); Masaru Wakabayashi, Ibaraki (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/965,900

(22) Filed: Apr. 28, 2018

(65) Prior Publication Data

US 2018/0341165 A1 Nov. 29, 2018

(30) Foreign Application Priority Data

May 24, 2017 (JP) .................................. 2017-102657

(51) Int. Cl.
*G02F 1/225* (2006.01)
*G02F 1/21* (2006.01)

(52) U.S. Cl.
CPC ...... *G02F 1/2257* (2013.01); *G02F 2001/212* (2013.01); *G02F 2201/063* (2013.01)

(58) Field of Classification Search
CPC . G02F 1/011; G02F 1/015; G02F 1/21; G02F 1/212; G02F 1/225; G02F 1/2257; G02F 2201/063; G02F 2001/212; G02F 1/025
See application file for complete search history.

(56) References Cited

U.S. PATENT DOCUMENTS

2014/0307300 A1* 10/2014 Yang ...................... G02F 1/025
                                                        359/245
2016/0291350 A1* 10/2016 Fujikata .................. G02F 1/025

FOREIGN PATENT DOCUMENTS

WO     WO 2014/076813 A1     5/2014

* cited by examiner

*Primary Examiner* — John Bedtelyon
(74) *Attorney, Agent, or Firm* — Shapiro, Gabor and Rosenberger, PLLC (57) ABSTRACT

In a semiconductor device connected to a first optical waveguide, a phase modulation unit, and a second optical waveguide in this order and having an optical modulator guiding light in a first direction, the phase modulation unit includes: a semiconductor layer whose length in the first direction is larger than a width in a second direction orthogonal to the first direction and which is made of monocrystalline silicon; a core part serving as an optical waveguide region formed on the semiconductor layer, and extending in the first direction; a pair of slab parts arranged on both sides of the core part in the second direction; a first electrode coupled with one of the slab parts; and a second electrode coupled with the other of the slab parts. The core part has a p type semiconductor region and an n type semiconductor region extending in the first direction, and the second direction coincides with a crystal orientation <100> of the semiconductor layer.

10 Claims, 9 Drawing Sheets

SEMICONDUCTOR DEVICE

CROSS-REFERENCE TO RELATED APPLICATION

The present application claims priority from Japanese Patent Application No. 2017-102657 filed on May 24, 2017, the content of which is hereby incorporated by reference into this application.

TECHNICAL FIELD OF THE INVENTION

The present invention relates to a semiconductor device, for example, can be applicably used for a semiconductor device that incorporates an optical modulator having a silicon optical waveguide.

BACKGROUND OF THE INVENTION

Use of high-speed communication has been recently expanded through mobile devices typified by smartphones in addition to popularization of broadband lines, and thereby demand for data communication in an optical communication network goes on increasing. To meet the demand for this communication, speed-up is advanced to transmission systems of 40 Gb/S and 100 Gb/S from a transmission system of 10 Gb/S having been used until now.

International Publication No. 2014/076813 (Patent Document 1) discloses a Mach-Zehnder type optical modulator that includes a silicon optical waveguide element(s) having a rib structure.

SUMMARY OF THE INVENTION

In the semiconductor device that incorporates the optical modulator having the silicon optical waveguide, miniaturization of the optical modulator is required. In other words, miniaturization of the semiconductor device incorporating the optical modulator is required.

The above and other objects and novel characteristics of the present invention will be apparent from the description of the present specification and the accompanying drawings.

A semiconductor device according to one embodiment is connected to a first optical waveguide, a phase modulation unit, and a second optical waveguide in this order, and has an optical modulator guiding light in a first direction. The phase modulation unit includes: a semiconductor layer whose length in the first direction is larger than a width in a second direction orthogonal to the first direction and which is made of monocrystalline silicon; a core part serving as an optical waveguide region formed on the semiconductor layer, and extending in the first direction; a pair of slab parts arranged on both sides of the core part in the second direction; a first electrode coupled with one of the slab parts; and a second electrode coupled with the other of the slab parts. The core part has a p type semiconductor region and an n type semiconductor region extending in the first direction, and the second direction coincides with a crystal orientation <100> of the semiconductor layer.

According to one embodiment, the miniaturization of the semiconductor device can be realized.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Also, even when mentioning that constituent elements or the like are "made of A" or "made up of A" in the embodiments below, elements other than A are of course not excluded except the case where it is particularly specified that A is the only element thereof. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, in some drawings used in the following embodiments, hatching is used even in a plan view so as to make the drawings easy to see. Components having the same function are denoted by the same reference characters throughout the drawings for describing the embodiments, and the repetitive description thereof will be omitted. Hereinafter, embodiments of the present invention will be described in detail with reference to the accompanying drawings.

Additionally, in the embodiments as described below, a crystal orientation <100> includes crystal orientations [100] and [010] etc. that are crystallographically equivalent. Further, a crystal face {100} includes crystal faces (100) and (010) etc. that are crystallographically equivalent.

Embodiment

Recently, positively developed has been a technique of realizing an optical communication module by: forming transmission lines each made of silicon (Si); using, as a platform, an optical circuit composed of those transmission lines; and integrating various optical devices and electronic devices, i.e., a so-called silicon photonics technique.

The present embodiment relates to an optical device, particularly, a semiconductor device incorporating an optical modulator. In description made below, explained will be a structure of an optical modulator formed on or over an SOI (Silicon On Insulator) substrate, and its manufacturing method.

<Optical Modulator>

Figure 1:
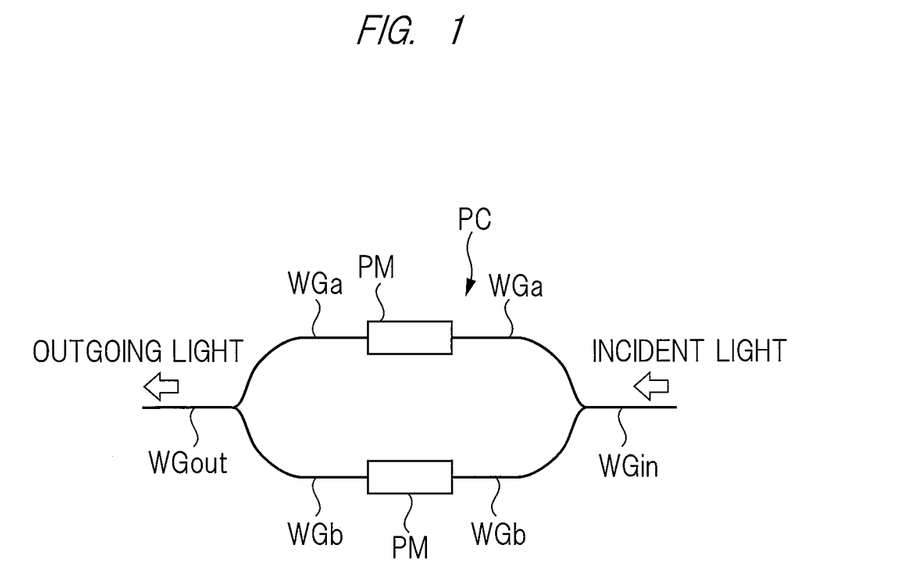
FIG. 1 is view illustrating a configuration of an optical modulator that is a semiconductor device according to the present embodiment.
Figure 2:
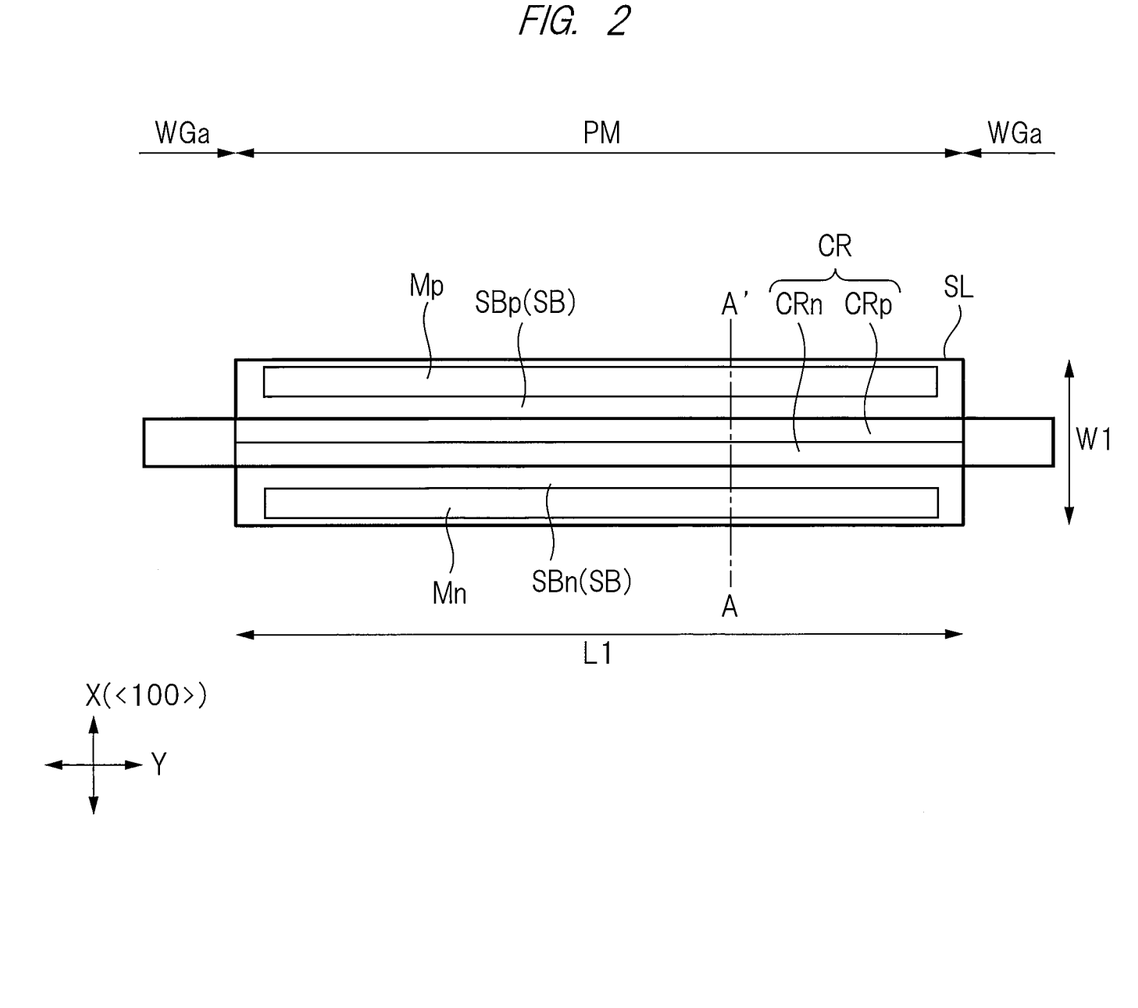
FIG. 2 is a plan view illustrating a configuration of a phase modulation unit that is a part of the optical modulator according to the present embodiment.
Figure 3:
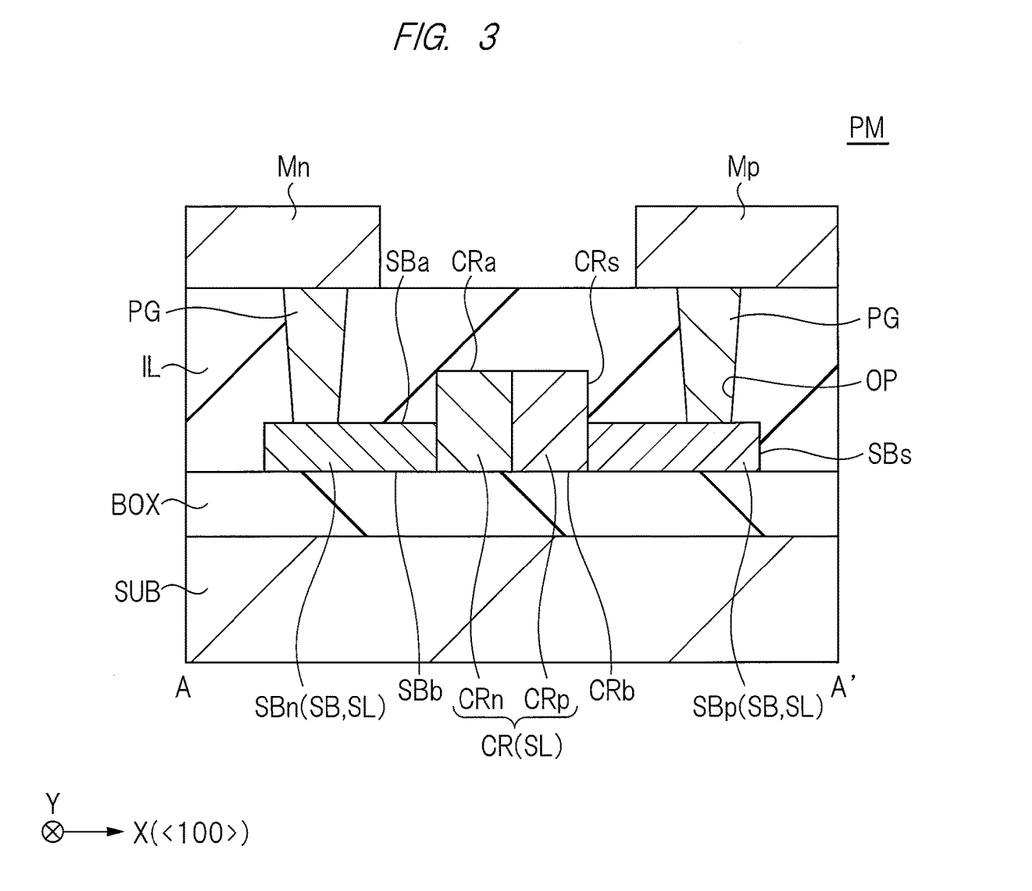
FIG. 3 is a sectional view taken along line A-A' of FIG. 2.
Figure 4:
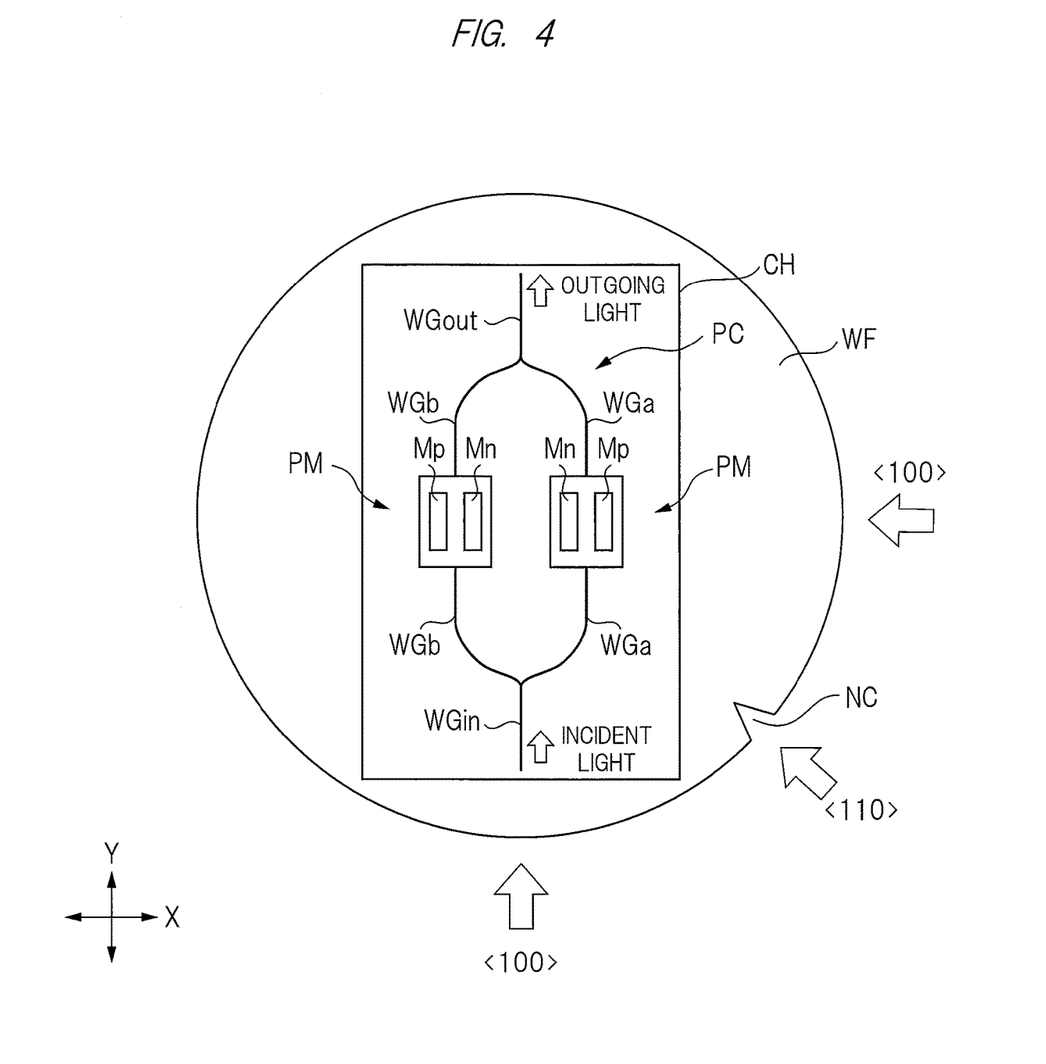
FIG. 4 is a view illustrating a configuration of the semiconductor device according to the present embodiment.

FIG. 1 is a view illustrating a configuration of an optical modulator that is a semiconductor device according to the present embodiment. FIG. 2 is a plan view illustrating a configuration of a phase modulation unit that uses variations of reflection indexes due to a carrier plasma effect and that is a part of the optical modulator according to the present embodiment. FIG. 3 is a sectional view taken along line A-A' of FIG. 2. FIG. 4 is a view illustrating a configuration of the semiconductor device according to the present embodiment.

FIG. 1 shows a Mach-Zehnder type optical modulator. As shown in FIG. 1, an optical modulator PC includes: an optical waveguide (input optical waveguide) WGin on which incident light is incident; an optical waveguide (output optical waveguide) WGout outputting outgoing light; and optical waveguides (distribution optical waveguides) WGa and WGb guiding two light beams distributed between the optical waveguides WGin and WGout. Further, connected to each of the optical waveguides WGa and WGb is a phase modulation unit PM for modulating a phase of light. The phase modulation unit PM may be provided only to any one of the optical waveguide WGa or WGb.

As shown in FIG. 2, the phase modulation unit PM includes a core part (optical waveguide region, thick plate part) CR, and a pair of slab parts (thin plate parts) SB arranged on both sides of the core part. The phase modulation unit PM has: a length L1 (e.g., 1 mm or more) in a Y direction (first direction) that is a direction of guiding (propagating) light; and a width W1 (e.g., 5 μm) in an X direction (second direction) orthogonal to the Y direction of guiding the light. That is, the phase modulation unit PM extends in the Y direction, and the length L1 of the phase modulation unit PM is larger in size than the width W1. Therefore, a reduction in a length-directional size of the phase modulation unit PM is effective for miniaturizing the optical modulator PC. In FIG. 2, the direction of guiding the light is, for example, the Y direction from a right side of the drawing toward a left side thereof.

The core part CR is an optical waveguide region, is connected to the optical waveguide (distribution optical waveguide) WGa at each of both ends in the Y direction, and outputs, to the left-side optical waveguide WGa, light inputted from the right-side optical waveguide WGa shown in FIG. 2. The core part CR extends in the Y direction, and the Y-directional length of the core part CR is longer than the X-directional width. As shown in FIG. 2, formed in the core part CR are a p type semiconductor region (first semiconductor region) CRp and an n type semiconductor region (second semiconductor region) CRn. The p type semiconductor region CRp and the n type semiconductor region CRn contact with each other in the X direction, and extend in the Y direction. A PN junction (PN junction part) is formed on a boundary between the p type semiconductor region CRp and the n type semiconductor region CRn, and extends in the Y direction.

The pair of slab parts SB is arranged on both ends of the core part CR in the X direction. That is, a p type semiconductor region (first slab part) SBp contacting with the p type semiconductor region CRp in the core part CR is placed on one end side (upper side in FIG. 2) of the core part CR, and an n type semiconductor region (second slab part) SBn contacting with the n type semiconductor region CRn in the core part CR is placed on the other side (second slab part) of the core part CR. Each of the p type semiconductor region SBp and the n type semiconductor region SBn extends in the Y direction, and each Y-directional length of the p type semiconductor region SBp and the n type semiconductor region SBn is longer than each X-directional width thereof.

Additionally, as shown in FIG. 2, an electrode (first electrode, wiring, metal wiring) Mp is placed on the p type semiconductor region SBp, and an electrode (second electrode, wiring, metal wiring) Mn is placed on the n type semiconductor region SBn. The electrode Mp is electrically coupled with the p type semiconductor region SBp, and the electrode Mn is electrically coupled with the n type semiconductor region SBn. Each of the electrodes Mp and Mn extends in the Y direction, and each Y-directional length of the electrodes Mp and Mn is longer than each X-directional width thereof.

FIG. 3 is a sectional view taken along line A-A', i.e., a sectional view of the phase modulation unit PM. The core part (optical waveguide region, thick plate part) CR and the slab parts (thin plate part) SB are formed on a semiconductor layer SL that is formed over a semiconductor substrate SUB via an insulating layer (buried insulating layer) BOX. The semiconductor substrate SUB is a supporting substrate made of monocrystalline silicon (Si), and its film thickness is about 750 μm. Incidentally, at a completion stage of the semiconductor device, the film thickness of the semiconductor substrate SUB can be set within a range of 50 to 200 μm. The insulating layer BOX is made of oxide silicon ($SiO_2$), and has a film thickness of, for example, about 2 to 3 μm.

Additionally, the semiconductor layer SL is made of monocrystalline silicon. A film thickness T1 of the core part CR is, for example, 200 nm, and a film thickness T2 of the slab part SB is, for example, 100 nm. The film thickness of the core part CR is larger than the film thickness of the slab part SB. The p type semiconductor region CRp and the n type semiconductor region CRn are formed in the core part CR, and the PN junction is formed in the boundary between the p type semiconductor region CRp and the n type semiconductor region CRn. Further, the p type semiconductor region SBp is formed in the slab part SB coupled with the p type semiconductor region CRp in the core part CR, and the n type semiconductor region SBn is formed in the slab part SB coupled with the n type semiconductor region CRn in the core part CR. An impurity concentration of the p type semiconductor region SBp is higher than an impurity concentration of the p type semiconductor region CRp, and an impurity concentration of the n type semiconductor region SBn is higher than an impurity concentration of the n type semiconductor region CRn. Incidentally, the film thickness of the core part CR may be equal to the film thickness of the slab part SB.

A main surface and a side wall (s) of the semiconductor layer SL are covered with, for example, an interlayer insulating layer IL made of oxide silicon (SiO$_2$). In other words, a main surface CRa and a side wall(s) CRs of the core part CR, and a main surface SBa and a side wall(s) of each slab part SB are covered with the interlayer insulating layer IL. Additionally, the interlayer insulating layer IL is a region, in which the semiconductor layer SL does not exist, and contacts with the insulating layer BOX. That is, the main surface, back surface, and side wall(s) of the semiconductor layer SL are surrounded by the interlayer insulating layer IL and the insulating layer BOX. Reflection indexes of the insulating layer BOX and the interlayer insulating layer IL are lower than a reflection index of the semiconductor layer SL, and the insulating layer BOX and the interlayer insulating layer IL each have a function of acting as a cladding layer that confines light in the semiconductor layer SL.

Further, as shown in FIG. 3, the p type semiconductor region SBp of the slab part SB is coupled with the electrode (first electrode, wiring, metal wiring) Mp via a plug electrode (conductor layer) PG, and the n type semiconductor region SBn of the slab part SB is coupled with the electrode (second electrode, wiring, metal wiring) Mn via a plug electrode (conductor layer) PG. Each plug electrode PG is formed in an opening OP provided in the interlayer insulating layer IL so that the main surface SBa of each slab part SB is exposed. The plug electrode PG is configured by a layered structure of a barrier conductor layer and a main conductor layer provided on the barrier conductor layer. The barrier conductor layer is made of, for example, titanium (Ti), titanium nitride (TiN), or the like. Its thickness is, for example, about 5 to 20 nm. The main conductor layer is made of, for example, tungsten (W). Additionally, each of the electrodes Mp and Mn is configured by a layered structure of a barrier conductor layer and a main conductor layer provided on the barrier conductor layer. The barrier conductor layer is made of, for example, tantalum (Ta), titanium (Ti), tantalum nitride (TaN), titanium nitride (TiN), or the like. The main conductor layer is made of, for example, aluminum (Al), copper (Cu), or an aluminum-copper alloy.

By feeding a desired potential to the electrodes Mp and Mn, the PN junction part formed in the core part CR can be forward-biased or reverse-biased.

The phase modulation unit PM of the optical modulator PC uses a carrier plasma effect to control a phase of the light by an electric signal (s). The carrier plasma effect is a phenomenon in which the reflection index of the core part CR increases/decreases depending on density of free carriers (electrons and positive holes) existing in the core part CR that is an optical waveguide region. The phase modulation unit PM uses this phenomenon to form light different in phase with respect to inputted light and to output it.

As mentioned above, the PN junction part is formed in the core part CR, but a region whose free carrier density is low and which is called a depletion layer occurs in the PN junction part. A width of the depletion layer can be arbitrarily changed by forward-biasing or reverse-biasing the PN junction part. In other words, by forward-biasing or reverse-biasing the PN junction part, it is possible to change the free carrier density of the core part CR, and to arbitrarily change the reflection index of the core part CR. Then, it is possible to change an effective reflection index (in other words, propagation speed of light) with respect to the light propagating the core part CR, and to change a phase of the light outputted from the phase modulation unit PM.

The optical modulator PC having the phase modulation unit PM like this can control a phase state of the outputted light by adjusting a bias voltage(s). For example, a reverse bias voltage is fed as the bias voltage. Additionally, although not illustrated in the drawing, a switch (switching element) is interposed between the electrodes Mn and Mp and, for example, a voltage higher than a voltage on the electrode Mp side is fed to the electrode Mn side when the switch is turned on. Here, a waveguide (propagation) direction (Y direction) of the light and an electric-field direction (X direction) of the bias voltage are orthogonal to each other. Additionally, the electric-field direction of the bias voltage is a direction, in which the width of the above-mentioned depletion layer fluctuates, and can say a substantively moving direction of free carriers (electrons and positive holes). The inventors in the present application has considered achieving miniaturization and power consumption reduction of the phase modulation unit PM (in other words, optical modulator PC) by improving mobility of the free carriers (particularly, positive holes).

Then, in the present embodiment as shown in FIGS. 3 and 4, the electric-field direction (X direction) of the bias voltage has been caused to coincide with a crystal orientation <100> of the semiconductor layer SL. In other words, the width direction of the semiconductor layer SL has been caused to coincide with the crystal orientation <100>. By this configuration, the mobility of the positive holes that are the free carriers is improved in applying the bias voltage to the phase modulation unit PM. Therefore, a high-speed operation of the optical modulator PC becomes possible, and the miniaturization and the power consumption reduction of the optical modulator PC can be achieved.

As shown in FIG. 4, for example, a semiconductor chip CH having the optical modulator PC is formed on a main surface of a semiconductor wafer WF having a notch NC in the crystal orientation <110>. The main surface of the semiconductor wafer WF is, for example, a crystal face {100}. Incidentally, the notch NC may be formed in the crystal orientation <100>. Only one semiconductor chip CH is illustrated on the semiconductor wafer WF, but may semiconductor chips CH are actually formed and arranged in matrix. Here, a waveguide direction of the light from the optical modulator PC coincides with the crystal orientation <100> that is the Y direction. Then, the electric-field direction of the bias voltage of the phase modulation unit PM coincides with the crystal orientation <100> that is the X direction. Namely, when the bias voltage is applied to the phase modulation unit PM, the positive holes serving as the free carriers in the core part CR shown by FIG. 3 substantively move in a direction coinciding with the crystal orientation <100>, so that the mobility of the positive holes serving as the free carriers is improved.

Additionally, as shown in FIG. 3, the main surface and the side wall of the semiconductor layer SL are covered with the interlayer insulating layer IL made of oxide silicon. Then, the main surface CRa and the side wall CRs of the core part CR, and the main surface SBa and the side wall SBs of each slab part SB contact with the interlayer insulating layer IL, the core part CR and each slab part SB being formed on the semiconductor layer SL.

Thus, in the phase modulation unit PM, since the electric-field direction (in other words, moving direction of the positive holes serving as the free carriers) of the bias voltage is caused to coincide with the crystal orientation <100> of the semiconductor layer SL, the mobility of the positive holes can be improved.

Figure 11:
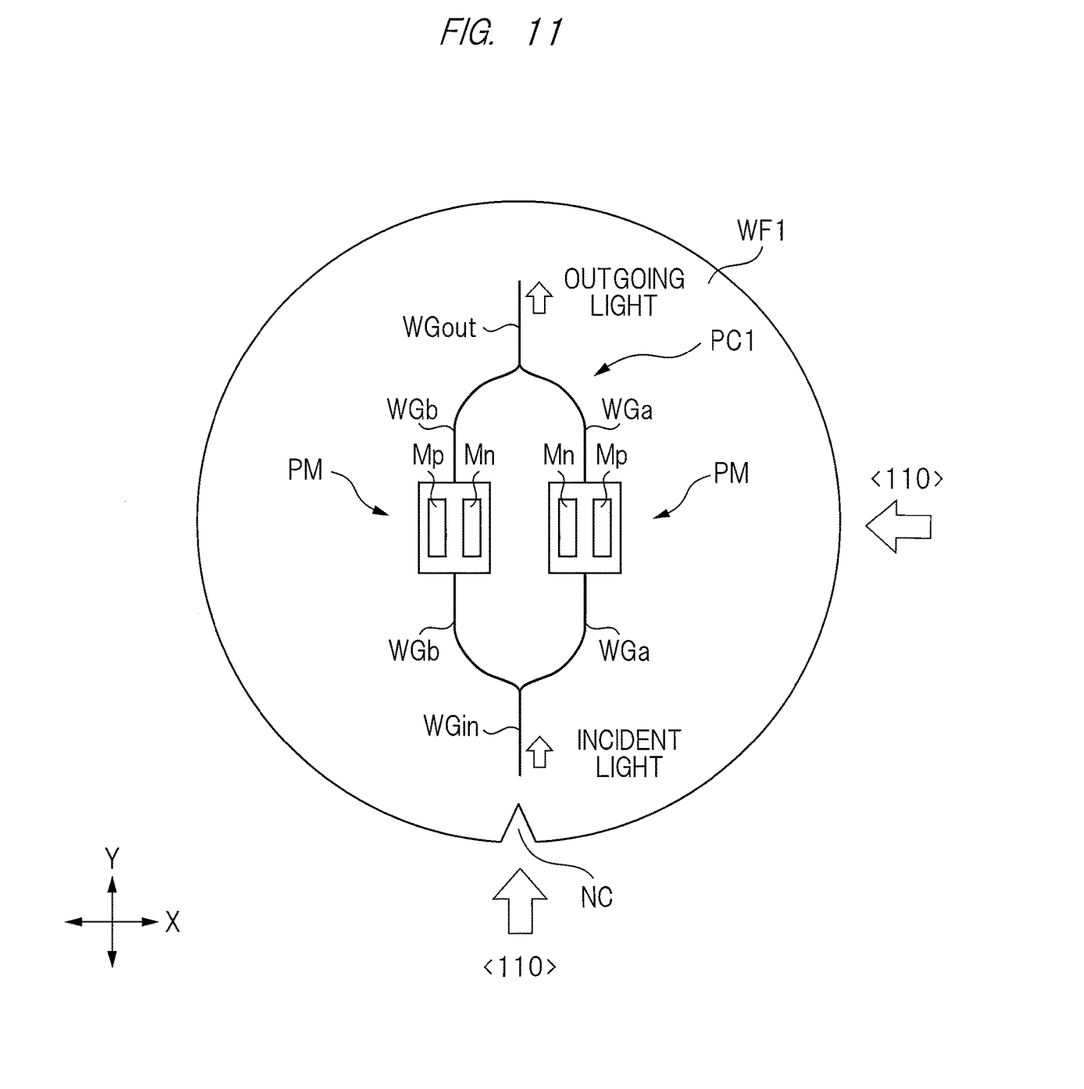
FIG. 11 is a plan view illustrating a configuration of an optical modulator of a comparative example.

Incidentally, FIG. 11 is a plan view illustrating a configuration of an optical modulator PC1 that is a comparative example. The optical modulator PC1 is formed on, for example, a main surface of a semiconductor wafer WF1 having the notch NC in the crystal orientation <110>. The main surface of the semiconductor wafer WF1 is, for example, a crystal face {100}. A waveguide direction of light from the optical modulator PC1 is placed in the crystal orientation <110>. Then, an electric-field direction of a bias voltage of the phase modulator PC1 is placed or directed in the crystal orientation <110>. When the bias voltage is applied to the phase modulation unit PM, the positive holes serving as the free carriers move in the crystal orientation <110>.

The power consumption reduction in the optical modulator PC according to the present embodiment can realized about two-tenths times lower than that in the optical modulator PC1 that is a comparative example. The inventors in the present application have analyzed a factor (s) of the power consumption reduction as described below. That is, since the electric-field direction of the bias voltage of the phase modulation unit PM is set to the crystal orientation <100>, the mobility of the positive holes (holes) that are the free carries have been improved. This is thought for the reason that effective masses of the positive holes are made small. As being apparent from (Equation 1), the large carrier plasma effect is caused as the effective masses of the positive holes become small. Therefore, a variation of the reflection indexes can be increased.

$$\Delta n = -\frac{e^2 \lambda^2}{8\pi^2 c^2 \varepsilon_0 n} \left( \frac{\Delta N_e}{m_e} + \frac{\Delta N_h}{m_h} \right) \quad \text{(Equation 1)}$$

Here, in the equation, "Δn" represents real part and imaginary part of a reflection index variation. The symbol "e" is an electric charge; "λ" is an optical wavelength; "$\varepsilon_0$" is a dielectric constant in vacuum; "n" is a reflection index of intrinsic semiconductor silicon; "me" is an effective mass of an electronic carrier; "mh" is an effective mass of a hole carrier; "$\Delta N_e$" is a change in concentration of electronic carriers; and "$\Delta N_h$" is a change in concentration of hole carriers.

Therefore, by improving the mobility of the positive holes that are the free carriers, the miniaturization (in other words, length reduction in the phase modulation unit PM) and the power consumption reduction (in other words, low bias voltage) of the optical modulator PC can be achieved.

<<Manufacturing Method of Phase Modulation Unit>>

A manufacturing method of a phase modulation unit that is a part of a semiconductor device according to the present embodiment will be explained in order of steps with reference to FIGS. 5 to 9. FIGS. 5 to 9 are sectional views during steps of manufacturing of the phase modulation unit based on the preset embodiment.

Figure 5:
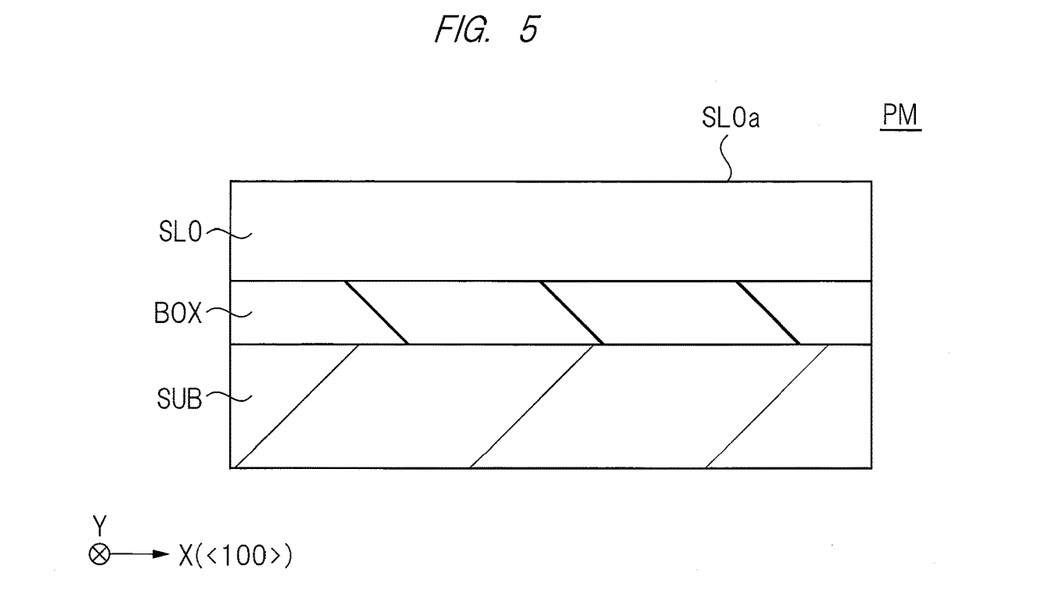
FIG. 5 is a sectional view during a manufacturing step of the phase modulation unit according to the present embodiment.

Firstly, as shown in FIG. 5, prepared is a SOI substrate (at this stage, a planar, substantially circular substrate called a SOI wafer) configured by: a semiconductor substrate SUB; an insulating layer BOX formed on a main surface of the semiconductor SUB; and a semiconductor layer SL0 formed on the insulating layer BOX. This SOI substrate corresponds to the semiconductor wafer WF having been explained by FIG. 4.

The semiconductor substrate SUB is a supporting substrate made of monocrystalline silicon (Si). The insulating layer BOX is made of oxide silicon ($SiO_2$). A semiconductor layer SL0 is made of monocrystalline silicon (Si). A main surface SL0a of the semiconductor layer SL0 has a crystal face {100}. A thickness of the semiconductor layer SUB is, for example, about 750 μm. A thickness of the insulating layer BOX is, for example, about 2 to 3 μm. A thickness of the semiconductor layer SL0 is, for example, about 100 to 400 nm, but is set at 200 nm as one example in this case. Incidentally, a reflection index of the insulating layer BOX is lower than a reflection index of the semiconductor layer SL0 in order to confine the light into the semiconductor layer SL.

Figure 6:
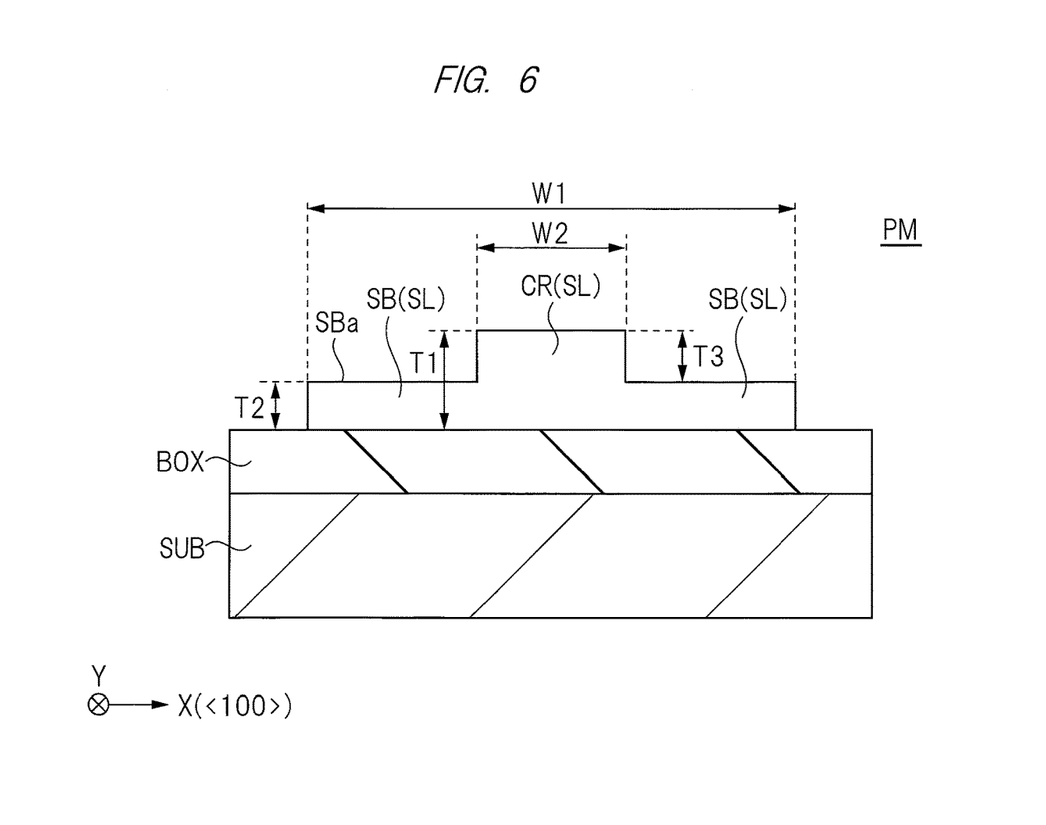
FIG. 6 is a sectional view during a manufacturing step subsequently to FIG. 5.

Next, as shown in FIG. 6, the above-mentioned semiconductor layer SL0 is subjected to a photolithography technique and an etching technique, and a semiconductor layer SL having a rib structure is formed. The semiconductor layer SL has a core part CR and a pair of slab parts SB located on both sides thereof. A width W1 of the semiconductor layer SL in the X direction is, for example, 5 μm. Then, the core part CR is located at a center of the semiconductor layer SL in the X direction. A width W2 of the core part CR is, for example, 400 to 600 nm. A film thickness T1 of the core part CR is, for example, 200 nm. A film thickness T2 of each slab part SB is, for example, 100 nm. Therefore, a film thickness T3 of the core part CR protruding from the main surface SBa of each slab part SB is, for example, 100 nm.

Figure 7:
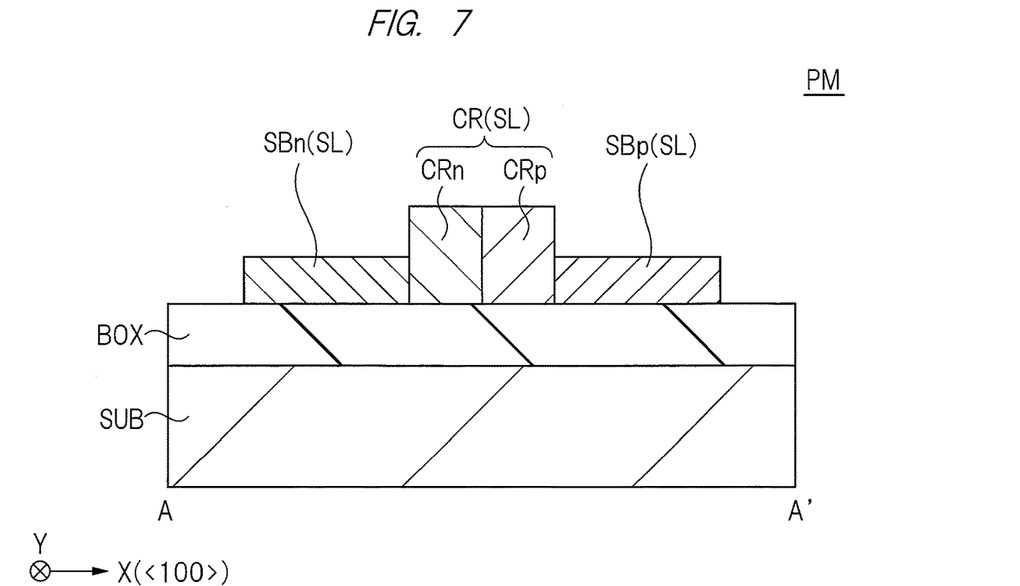
FIG. 7 is a sectional view during a manufacturing step subsequently to FIG. 6.

Next, as shown in FIG. 7, p type impurities (e.g., boron (B)) are injected into a region of a portion of the core part CR, and a p type semiconductor region CRp is formed. Further, n type impurities (e.g., phosphorus (P) or arsenic (As)) are injected into a region other than the p type semiconductor region CRp in the core part CR, and an n type semiconductor region CRn is formed. The p type semiconductor region CRp and the n type semiconductor region CRn contact with each other in the core part CR, thereby forming a PN junction (PN junction part).

Further, p type impurities (e.g., boron (B)) are injected into one of the slab parts SB, and a p type semiconductor region SBp is formed so as to contact with the p type semiconductor region CRp. N type impurities (e.g., phosphorus (P) or arsenic (AS)) are injected into the other of the slab parts SB, and an n type semiconductor region SBn is formed so as to contact with the n type semiconductor region CRn.

Here, an impurity concentration of the p type semiconductor region SBp is higher than an impurity concentration of the p semiconductor region CRp, and the p type semiconductor region SBp is made lower in resistance than the p type semiconductor region CRp. Additionally, an impurity concentration of the n type semiconductor region SBn is higher than an impurity concentration of the n type semiconductor region CRn, and the n type semiconductor region SBn is made lower in resistance than the n type semiconductor region CRn. Further, the impurity concentrations of the p type semiconductor region CRp and the n type semiconductor region CRn are preferably set at $1 \times 10^{17}$ $cm^{-3}$ to $1 \times 10^{18}$ $cm^{-3}$. The impurity concentrations of the p type semiconductor region CRp and the n type semiconductor region CRn are preferably set at $1 \times 10^{17}$ $cm^{-3}$ or more, for example, in order to control a width of the depletion layer that is formed by applying reverse bias to the PN junction formed in the core part CR. Moreover, the impurity concentrations of the p type semiconductor region CRp and the n type semiconductor region CRn are preferably set at $1\times10^{18}$ cm$^{-3}$ or less, for example, in order to prevent a scatter of light propagating the core part CR.

Furthermore, the impurity concentrations of the p type semiconductor region SBp and the n type semiconductor region SBn are preferably set at $1\times10^{20}$ cm$^{-3}$ or more in order to be made lower in resistance.

Figure 8:
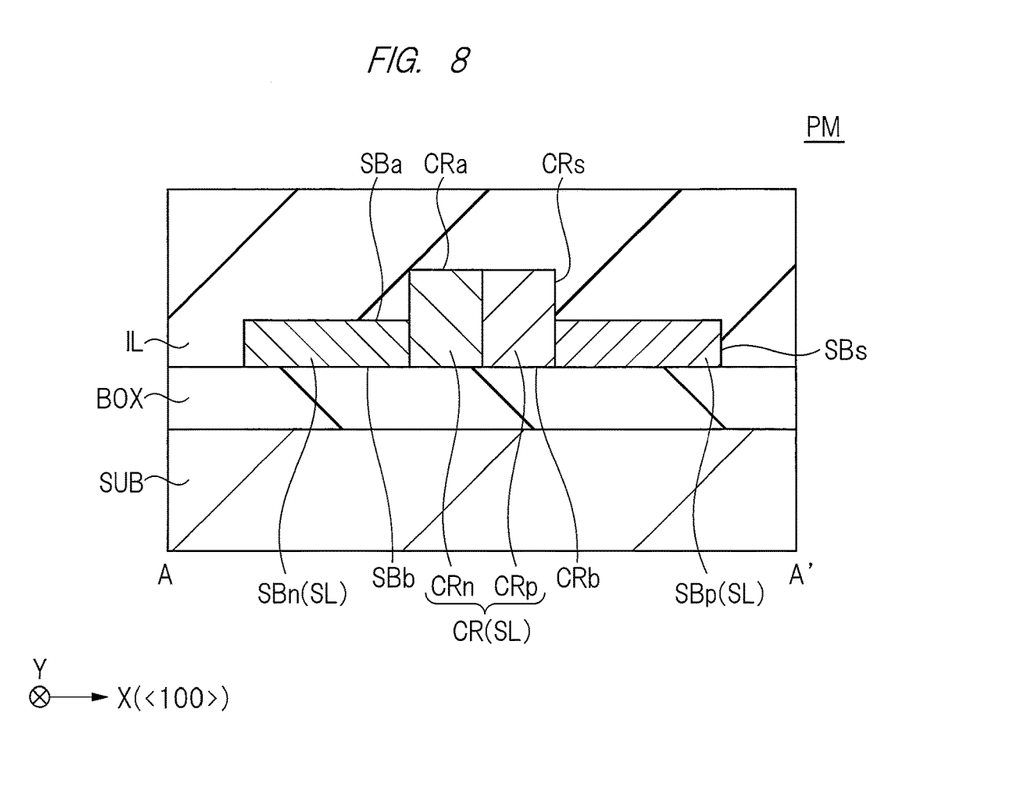
FIG. 8 is a sectional view during a manufacturing step subsequently to FIG. 7.

Next, as shown in FIG. 8, an interlayer insulating layer IL is formed so as to cover the semiconductor layer SL. The interlayer insulating layer IL is made of, for example, oxide silicon (SiO$_2$) with compressive stress. A main surface CRa and side walls CRs of the core part CR, and a main surface SBa and side walls SBs of each slab part SB contact with the interlayer insulating layer IL. Then, the core part CR and the slab parts SB are subjected to compressive stress from interlayer insulating layer IL in the X and Y directions. Additionally, a reflection index of the interlayer insulating layer IL is lower than a reflection index of the semiconductor layer SL0 in order to confine the light into the semiconductor layer SL. Further, a film thickness of the interlayer insulating layer IL is preferably set at 1 to 2 μm so that the guided light do not derogate by a scatter of light exuding and leaking from the semiconductor layer SL0.

Figure 9:
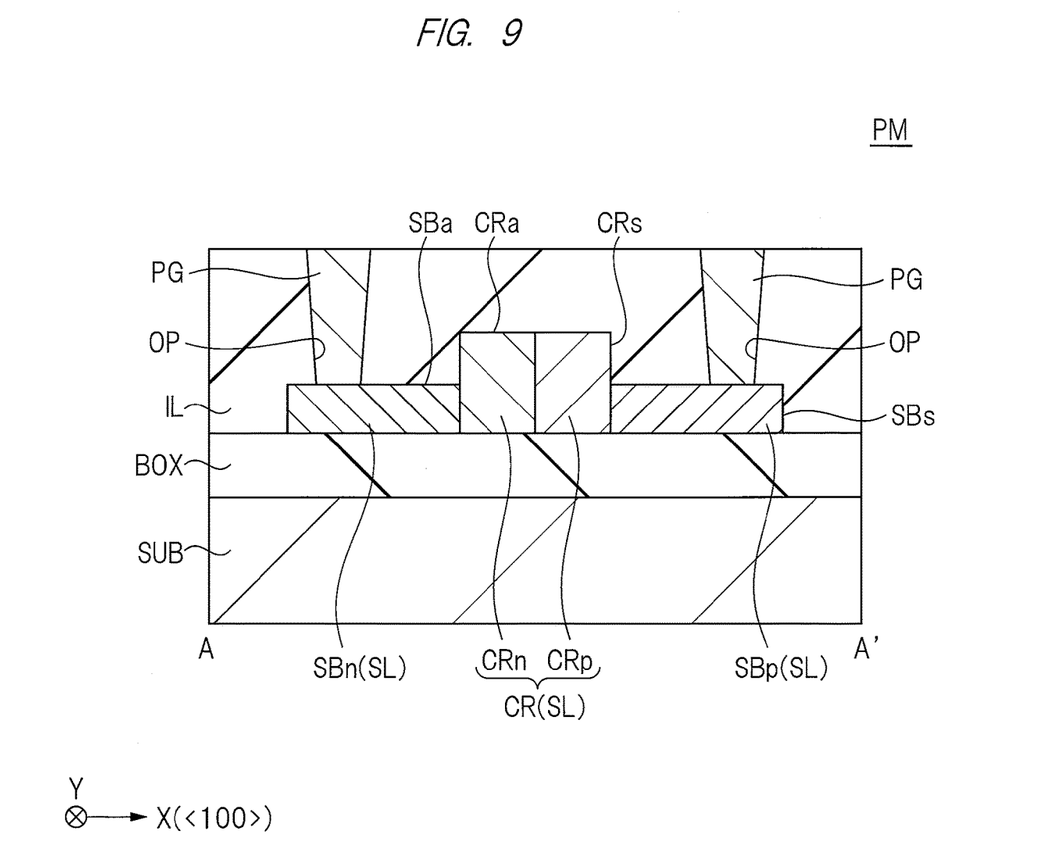
FIG. 9 is a sectional view during a manufacturing step subsequently to FIG. 8.

Next, shown in FIG. 9, openings OP are formed in the interlayer insulating layer IL, and each portion of the main surfaces SBa of the paired slab parts SB is exposed therefrom. Then, a plug electrode PG is formed in each opening OP. Thereafter, the electrodes Mp and Mn explained in FIG. 3 are formed. The electrode Mp is coupled with the p type semiconductor layer SBp of the slab part SB via the plug electrode PG, and the electrode Mn is coupled with the n type semiconductor layer SBn of the slab part SB via the plug electrode PG. Thus, the phase modulation unit PM in the semiconductor device according to the present embodiment is completed.

According to the present embodiment, the phase modulation unit PM of the optical modulator PC is formed by the semiconductor layer SL made of monocrystalline silicon, and the semiconductor layer SL has: the first width W1 in the second direction (X direction) orthogonal to the first direction (Y direction) that is a guiding direction of light; and the first length L1 larger than the first width W1 in the first direction. The semiconductor layer SL includes the p type semiconductor region CRp and the n type semiconductor region CRn, and has: the core part CR extending in the first direction; and the first slab part SB and the second slab part SB arranged on the both ends of the core part CR. Further, the first electrode Mp is coupled with the first slab part SB, and the second electrode Mn is coupled with the second slab part SB. Then, the second direction (X direction) that is the width direction of the semiconductor layer SL coincides with the crystal orientation <100> of the semiconductor layer SL.

By the above-mentioned configuration, the moving direction of the positive holes that are the free carriers can be caused to coincide with the crystal orientation <100> in the phase modulation unit PM. This improves, for example, the mobility of the positive holes in comparison with the comparative example, so that the miniaturization and power consumption reduction of the phase modulation unit PM can be realized.

Additionally, the p type semiconductor region CRp and the n type semiconductor region CRn configuring the core part CR have the PN junction part, and a direction of an electric field applied to the PN junction part is caused to coincide with the crystal orientation <100> of the semiconductor layer SL, so that the mobility of the positive holes can be improved.

Modification Example 1

Figure 10:
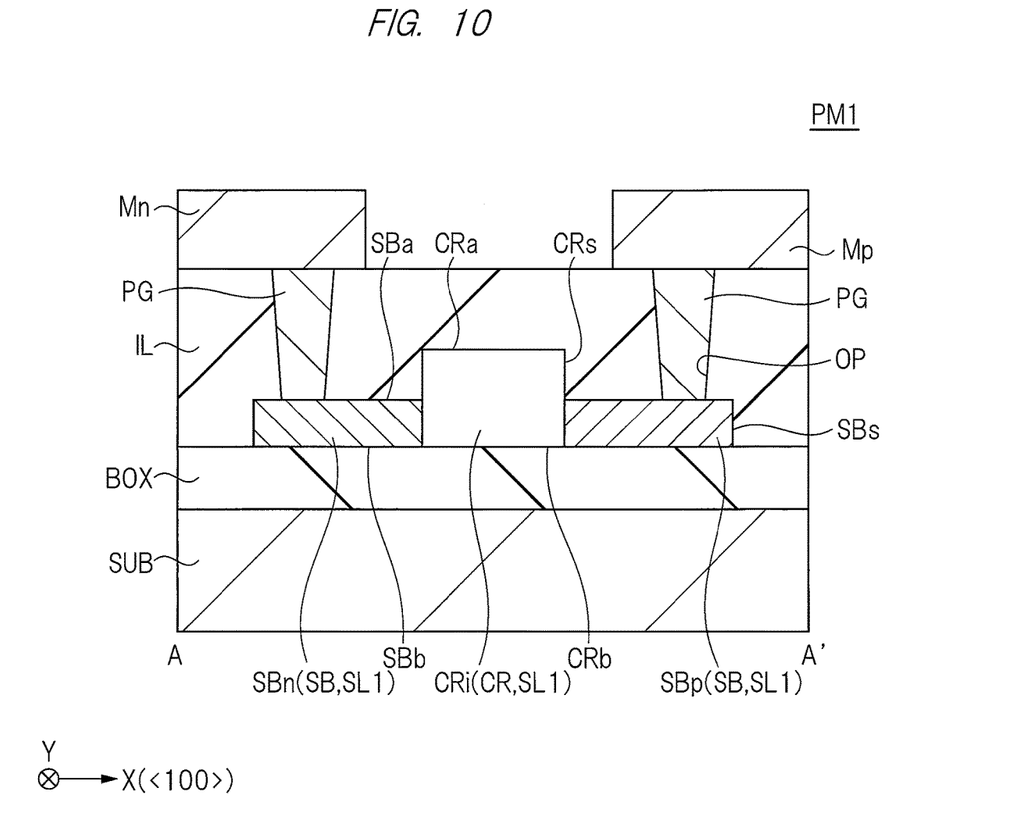
FIG. 10 is a sectional view illustrating a configuration of a phase modulation unit of modification example 1.

Modification Example 1 is a modification example of the phase modulation unit PM according to the above-mentioned embodiment. In a phase modulation unit PM1 of modulation example 1, the core part CR is formed by an intrinsic semiconductor CRi. Constituent elements common to the above embodiment and this modification example 1 are denoted by the same reference numerals.

FIG. 10 is a sectional view illustrating a configuration of a phase modulation unit of modification example 1. As shown in FIG. 10, a semiconductor layer SL1 has: a core part CR that is an optical waveguide region; and a pair of slab parts arranged on both ends of the core part CR. Then, the core part CR is configured by an intrinsic semiconductor region CRi. A p type semiconductor region SBp is formed in the slab part SB contacting with one end of the core part CR in the X direction, and an n type semiconductor region SBn is formed in the slab part SB contacting with the other end. Namely, a PIN diode is formed in a semiconductor layer SL1. Between the electrodes Mp and Mn in the phase modulation unit PM1 of modification example 1, for example, forward bias is applied to change density of free carriers in the core part CR, so that a carrier plasma effect is used to change a reflection index of light in the core part CR.

Similarly to the above embodiment, an electric-filed direction of a bias voltage with respect to the PIN diode is caused to coincide with a crystal orientation <100> of the semiconductor layer SL1, which makes it possible to improve mobility of positive holes and to realize miniaturization and power consumption reduction of the phase modulation unit PM1.

A planar structure of the phase modulation unit PM1 in modification example 1 becomes a structure in which the p type semiconductor region CRp and the n type semiconductor region CRn in the core part CR in FIG. 2 are replaced by the intrinsic semiconductor region CRi. Namely, the electric-field direction (in other words, moving direction of the positive holes serving as the free carriers) of the bias voltage with respect to the PIN diode coincide with a width direction (X direction in FIG. 2) of the semiconductor layer SL1.

In the foregoing, the invention made by the inventors of the present invention has been concretely described based on the embodiments. However, it is needless to say that the present invention is not limited to the foregoing embodiments and various modifications and alterations can be made within a range not departing from the gist of the present invention.

What is claimed is:
1. A semiconductor device connected to a first optical waveguide, a phase modulation unit, and a second optical waveguide in this order and having an optical modulator guiding light in a first direction,
the phase modulation unit comprising:
   a semiconductor layer having a first width in a second direction orthogonal to the first direction, having a first length larger than the first width in the first direction, and made of monocrystalline silicon;
   a core part serving as an optical waveguide region formed in the semiconductor layer, and extending in the first direction;
   a first slab part and a second slab part formed on the semiconductor layer and arranged on both sides of the core part in the second direction;
   a first electrode coupled with the first slab part; and
   a second electrode coupled with the second slab part, wherein the core part has a p-type first semiconductor region extending in the first direction, and an n-type second semiconductor region extending in the first direction, the first slab part has a p-type third semiconductor region coupled with the first semiconductor region, the second slab part has an n-type fourth semiconductor region coupled with the second semiconductor region, and the second direction coincides with a crystal orientation <100> of the semiconductor layer.

2. The semiconductor device according to claim 1, wherein the first and second semiconductor regions form a PN junction, and a direction of an electric field applied to the PN junction by the first and second electrodes coincides with the crystal orientation <100>.

3. The semiconductor device according to claim 1, wherein impurity concentrations of the first and second semiconductor regions are $1 \times 10^{17}$ cm-3 or more and $1 \times 10^{18}$ cm$^3$ or less.

4. The semiconductor device according to claim 1, wherein an impurity concentration of the third semiconductor region is higher than that of the first semiconductor region, and an impurity concentration of the fourth semiconductor region is higher than that of the second semiconductor region.

5. The semiconductor device according to claim 1, wherein a film thickness of the core part is equal to or larger than those of the first and second slab parts.

6. The semiconductor device according to claim 1, further comprising a first insulating layer contacting with a back surface of the semiconductor layer in the core part and a back surface of the semiconductor layer in the first and second slab parts, wherein a refractive index of the first insulating layer is lower than that of the semiconductor layer.

7. The semiconductor device according to claim 6, further comprising a second insulating layer covering a main surface and a side wall of the semiconductor layer in the core part and main surfaces and side walls of the semiconductor layer in the first and second slab parts, and contacting with the first insulating layer, wherein a refractive index of the second insulating layer is lower than that of the semiconductor layer.

8. The semiconductor device according to claim 1, wherein the first and second electrodes extend in the first direction.

9. A semiconductor device connected to a first optical waveguide, a phase modulation unit, and a second optical waveguide in this order and having an optical modulator guiding light in a first direction, the phase modulation unit comprising:
a semiconductor layer having a first width in a second direction orthogonal to the first direction, having a first length larger than the first width in the first direction, and made of monocrystalline silicon;

a core part serving as an optical waveguide region formed in the semiconductor layer, and extending in the first direction, a first slab part and a second slab part formed on the semiconductor layer and arranged on both sides of the core part in the second direction;

a first electrode coupled with the first slab part; and
a second electrode coupled with the second slab part,
wherein the core part has an intrinsic semiconductor region, the first slab part has a p-type first semiconductor region coupled with the intrinsic semiconductor region, the second slab part has an n-type second semiconductor region coupled with the intrinsic semiconductor region, and the second direction coincides with a crystal orientation <100> of the semiconductor layer.

10. The semiconductor device according to claim 9, further comprising:

a first insulating layer contacting with a back surface of the semiconductor layer in the core part and a back surface of the semiconductor layer in the first and second slab parts; and a second insulating layer covering a main surface and a side wall of the semiconductor layer in the core part and a main surface and a side wall of the semiconductor layer in the first and second slab parts, and contacting with the first insulating layer, wherein refractive indexes of the first and second insulating layers are lower than that of the semiconductor layer.

* * * * *